(12) United States Patent
Seela et al.

(10) Patent No.: US 9,916,202 B1
(45) Date of Patent: Mar. 13, 2018

(54) REDIRECTING HOST IO'S AT DESTINATION DURING REPLICATION

(71) Applicant: EMC Corporation, Hopkinton, MA (US)

(72) Inventors: Nagapraveen V. Seela, Cary, NC (US); Michael C. Brundage, Cary, NC (US); Yan Xu, Boston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 227 days.

(21) Appl. No.: 14/644,482

(22) Filed: Mar. 11, 2015

(51) Int. Cl.
| G06F 7/00 | (2006.01) |
| G06F 17/00 | (2006.01) |
| G06F 11/14 | (2006.01) |
| H04L 29/08 | (2006.01) |
| G06F 17/30 | (2006.01) |
| G06F 15/16 | (2006.01) |

(52) U.S. Cl.
CPC ...... *G06F 11/1451* (2013.01); *G06F 11/1435* (2013.01); *G06F 11/1464* (2013.01); *G06F 17/30088* (2013.01); *H04L 67/1095* (2013.01); *H04L 67/1097* (2013.01); *G06F 2201/84* (2013.01)

(58) Field of Classification Search
CPC ........... G06F 17/30088; G06F 11/1451; G06F 11/1464
USPC ....................................................... 707/649
See application file for complete search history.

(56) References Cited

U.S. PATENT DOCUMENTS

| 7,383,463 | B2 | 6/2008 | Hayden et al. | |
| 7,555,674 | B1 | 6/2009 | Wang | |
| 7,676,514 | B2 * | 3/2010 | Faibish | G06F 3/061 |
| | | | | 707/649 |
| 7,769,722 | B1 * | 8/2010 | Bergant | G06F 17/30088 |
| | | | | 707/681 |
| 8,401,997 | B1 * | 3/2013 | Tawri | G06F 11/2064 |
| | | | | 707/655 |
| 8,495,112 | B2 * | 7/2013 | Adkins | G06F 17/30094 |
| | | | | 707/649 |
| 9,021,307 | B1 | 4/2015 | Parameswaran et al. | |
| 9,032,160 | B1 | 5/2015 | Natanzon et al. | |
| 2004/0024961 | A1 * | 2/2004 | Cochran | G06F 3/065 |
| | | | | 711/112 |
| 2007/0156506 | A1 * | 7/2007 | Hara | G06F 17/30088 |
| | | | | 705/7.36 |
| 2008/0082593 | A1 * | 4/2008 | Komarov | G06F 11/1451 |
| | | | | 707/999.204 |
| 2009/0313503 | A1 * | 12/2009 | Atluri | G06F 11/1464 |
| | | | | 714/19 |
| 2011/0258461 | A1 * | 10/2011 | Bates | G06F 11/1435 |
| | | | | 713/190 |

(Continued)

Primary Examiner — Usmaan Saeed
Assistant Examiner — Brian E. Weinrich
(74) Attorney, Agent, or Firm — BainwoodHuang

(57) ABSTRACT

A technique for providing access to a data object serving as a target of snapshot-shipping replication includes taking a system snap of the data object after completion of each of multiple snapshot-shipping updates. In response to a data storage system receiving an IO (input/output) request to read and/or write to the data object, a data storage system redirects the IO request to a previously generated system snap, so that the data storage system performs the operation specified in the IO request on the system snap rather than of the data object itself.

12 Claims, 6 Drawing Sheets

(56) References Cited

U.S. PATENT DOCUMENTS

| | | |
|---|---|---|
| 2012/0158659 A1 | 6/2012 | Marathe et al. |
| 2013/0339569 A1* | 12/2013 | Yochai ................ G06F 11/1415 |
| | | 711/102 |
| 2014/0081911 A1 | 3/2014 | Deshpande |
| 2014/0325616 A1* | 10/2014 | Dolph ............... G06F 17/30088 |
| | | 726/5 |

* cited by examiner

REDIRECTING HOST IO'S AT DESTINATION DURING REPLICATION

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly employ snapshot-shipping replication for protecting the data they store. A well-known snapshot-shipping solution is the Celerra Replicator™ V2, which is available from EMC Corporation of Hopkinton, Mass. Replicator V2 operates by taking snaps (i.e., point-in-time versions) of data objects at a source data storage system, identifying differences between current snaps and previous snaps, and sending the differences to a destination data storage system. The destination receives the differences and applies them to corresponding objects maintained locally, to update the objects with changes that mirror those made to the respective objects at the source. The objects at the destination may thus be regarded as replicas of the objects at the source, and the role of serving the objects to hosts may failover from source to destination in the event of a loss of service at the source.

SUMMARY

When using a snapshot-shipping session to replicate an active production version of a data object from a source to a destination, the destination typically receives snapshot-shipping updates on a regular basis and/or in response to particular events, to keep the version of the data object at the destination approximately current with the active production version at the source. For example, a replication session may update the data object at the destination as needed to meet desired settings for RPO (recovery point objective) and/or RTO (recovery time objective).

Sometimes, it is desirable for an administrator or other user to access a data object stored on a destination data storage system. For example, an administrator may mount the data object and read and/or write to the data object, e.g., as part of a DR (disaster recovery) testing procedure to verify that the data object at the destination can serve as a reliable target of failover in the event that something goes wrong at the source. Because the data object may regularly receive snapshot-shipping updates, however, there is no guarantee that the data object will remain in a consistent state throughout the DR testing. Unfortunately, changes in the data object during the course of DR testing may cause the data object to appear corrupted, which may lead the administrator to conclude improperly that DR testing has failed.

In contrast with prior approaches, in which data objects undergoing replication updates can appear corrupted when accessed by users, an improved technique for providing access to a data object serving as a target of snapshot-shipping replication includes taking a system snap of the data object after completion of each of multiple snapshot-shipping updates. In response to a data storage system receiving an IO (input/output) request to read and/or write to the data object, e.g., as part of DR testing, a data storage system redirects the IO request to a previously generated system snap, so that the data storage system performs the operation specified in the IO request on the system snap rather than of the data object itself. As the system snap remains consistent during snapshot-shipping updates to the data object, the system snap serves as a reliable and stable version of the data object, which users can exercise to perform DR testing and/or for other purposes, regardless of the state of the data object.

In some examples, redirection of IO requests is performed selectively, based on whether any snapshot-shipping update is in progress when an IO request arrives. For example, if a data storage system receives an IO request when no snapshot-shipping update is in progress, the data storage system may direct the IO request to the data object, rather than redirecting the IO request to the system snap. However, if the data storage system receives an IO request when a snapshot-shipping update is currently in progress, the data storage system may redirect the IO request to the system snap.

Certain embodiments are directed to a method for processing IO (input/output) requests. The method includes performing, at a destination data storage system, multiple snapshot-shipping updates to a data object. Each snapshot-shipping update applies a set of changes to the data object to bring the data object into a state that is content-consistent with that of a source object operated from a source data storage system. The snapshot-shipping updates are performed at respective times to keep the data object substantially current with the source object as the source object changes over time. After performing each snapshot-shipping update to the data object and before performing another one, the method further includes generating a system snap of the data object, each system snap providing a point-in-time version of the data object that reflects a state of the data object after completion of the respective snapshot-shipping update. Upon receiving an IO request directed to the data object for performing a read operation on the data object, the method still further includes redirecting the IO request to a previously generated system snap, so that the destination data storage system performs the read operation on the system snap rather than on the data object itself.

Other embodiments are directed to a data storage system constructed and arranged to perform a method for processing IO requests, such as the one described above. Still other embodiments are directed to a computer program product. The computer program product stores instructions which, when executed on a set of processing units of a destination data storage apparatus, cause the set of processing units to perform a method for processing IO requests, such as that described above. Some embodiments may involve activity that is performed at a single location, while other embodiments may involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for providing access to a data object serving as a target of snapshot-shipping replication includes taking a system snap of the data object after completion of each of multiple snapshot-shipping updates. In response to a data storage system receiving an IO request to read and/or write to the data object, e.g., as part of DR testing, a data storage system redirects the IO request to a previously generated system snap, so that the data storage system performs the operation specified in the IO request on the system snap rather than of the data object itself.

Figure 1:
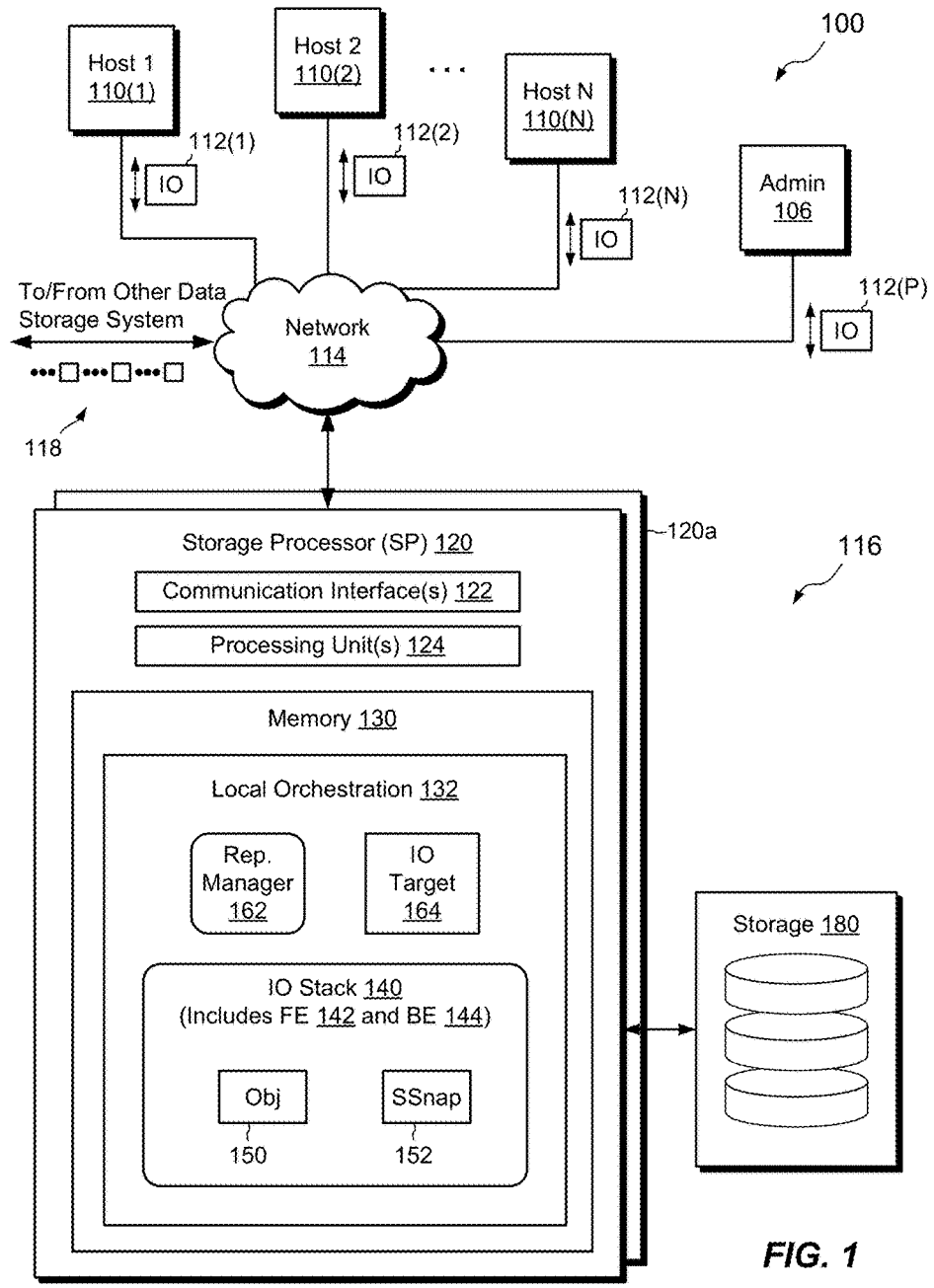
FIG. 1 is a block diagram showing an example environment in which improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of magnetic disk drives, electronic flash drives, and/or optical drives, for example. The data storage system 116 may include multiple SPs like the SP 120 (e.g., a second SP, 120a). In an example, multiple SPs may be provided as circuit board assemblies, or "blades," which plug into a chassis, which encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

Although FIG. 1 shows only a single data storage system 116, it is understood that some operations described herein involve activities that take place between two data storage systems, e.g., between a source data storage system (source) and a destination data storage system (destination). The source and destination may be connected via the network 114 or via any suitable means. The particular construction shown for the data storage system 116 is intended to be representative of both the source and the destination, although it should be understood that the source and the destination may be allowed to vary in their particular details.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. In some examples, the SP 120 is configured to receive IO requests 112(1-N) according to both block-based and file-based protocols and to respond to such IO requests 112(1-N) by reading or writing the storage 180. In other examples, the SP 120 is configured to receive and process IO requests 112(1-N) according to either block-based protocols or file-based protocols, but not according to both.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein, e.g., alone or in coordination with similar control circuitry on another data storage system. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes local orchestration 132, which itself includes an IO stack 140, a replication manager 162, and a data element, identified here as IO target 164. The local orchestration 132 controls and coordinates various software constructs within the memory 130.

The IO stack 140 provides an execution path for host IOs, e.g., for IO requests 112(1-N). In some examples, the IO stack 140 is provided in the form of a separate front end (FE) 142 and back end (BE) 144. The front end 142 runs locally on SP 120. The back end 144 may also run locally on SP 120, or it may run on another SP (e.g., on SP 120a) or on a block-based array connected to SP 120 (e.g., in a gateway configuration). The IO stack 140 provides access to data objects stored in the data storage system 116, such as object 150 ("Obj") and system snap ("SSnap") 152. System snaps, such as the system snap 152, are generated automatically by the data storage system 116 at predetermined times and/or in response to predetermined events. In contrast, user snaps (not shown) are generated on-demand by administrators or other users. In an example, the data object 150 is a host-accessible object, such as a LUN (logical unit number), a host file system, or a VVol, for example (VVols are virtual volumes, e.g., available from VMware, Inc. of Palo Alto, Calif.). The snap 152, as well as any other system snaps or user snaps, are point-in-time versions of the data object, or point-in-time versions of other snaps of the data object, and are mountable or otherwise accessible the same way as is the data object. In some implementations, system snaps, like the snap 152, are hidden from hosts but remain available to internal processes running on the data storage system 116 and/or to administrators.

The replication manager 162 controls replication settings and operations for specified data objects. In an example, the replication manager 162 establishes replication settings on a per-data-object basis, conducts replication sessions, and orchestrates replication activities, including recovery and failover. For instance, the replication manager 162 establishes and controls snapshot-shipping replication for the data object 150, e.g., acting as either source or target of replication. Although FIG. 1 shows only a single data object 150 and a single snap 152, it should be understood that the data storage system 116 may store any number of data objects, and any number of snaps of those data objects, and that the data storage system 116 may provide host access to such data objects simultaneously. The replication manager 162 may establish and control replication for any such data objects. The data storage system 116 may act as a replication source for some data objects and as a replication destination for others.

The IO target 164 identifies particular versions of data objects to be used as targets of incoming IO requests 112(1-N). For example, the data storage system 116 may store a primary version of a data object, such as data object 150, and may store any number of secondary versions of the data object, such as system snap 152. In such cases, the IO target 164 identifies a single version of the data object (e.g., either 150 or 152) to serve as the target of IO requests. The IO target 164 may store similar version information for other data objects. In an example, the data storage system 116 persists the data stored in the IO target 164, e.g., in the storage 180, such that the IO target 164 may be retained and later restored in the event of a system panic or power failure.

In example operation, the hosts 110(1-N) issue IO requests 112(1-N) to the data storage system 116 for reading and/or writing data objects, such as the data object 150. The SP 120 receives the IO requests 112(1-N) at the communication interfaces 122 and forwards the IO requests 112(1-N) to the IO stack 140 for further processing. In an example, the data storage system 116 internally realizes data objects as respective container files in a set of internal, container file systems accessible from within the IO stack 140, and employs mapping to express the container files as respective host-accessible objects. For example, upon receiving the IO requests 112(1-N), the front end 142 maps the IO requests to internal, block-based requests directed to internal volumes. The front end 142 further maps the internal volumes to respective container files. The 10 stack 140 thus converts incoming host 10 requests 112(1-N) into corresponding requests to container files. As will be described infra, the front end 142 may perform snapshot-shipping replication at the level of these container files, using container files as sources and/or targets of snapshot-shipping operations. After processing by the front end 142, the IO requests propagate to the back end 144, and the back end 144 executes commands for reading and/or writing the physical storage 180.

For descriptive purposes, it is now assumed that the data storage system 116 is configured to act as a destination for snapshot-shipping replication for the data object 150, such that the data object 150 represents a replica of a similar data object hosted from a source data storage system located elsewhere. In an example, the version of the data object at the source (not shown in FIG. 1) is a production version, which hosts actively access such that its contents change over time. As part of an ongoing snapshot-shipping replication session, the data storage system 116 receives, e.g., on a regular basis and/or in response to particular events, snapshot-shipping updates 118 from the source data storage system. Each snapshot-shipping update 118 includes an accumulation of changes since the immediately previous snapshot-shipping update 118. As the data storage system 116 receives each update 118, the data storage system 116 applies the update to the data object 150, i.e., to implement the changes on the data object 150 and thus to bring the data object 150 into a content-consistent state with the version of the data object at the source. After completing each snapshot-shipping update 118, the data storage system 116 automatically generates a new system snap of the data object 150, such that a fresh system snap reflecting the recently applied changes is made available. Optionally, the data storage system 116 may destroy each previous system snap after taking each new system snap. New snapshot-shipping updates 118 may arrive every few minutes, hours, or days, depending on replication settings and/or on how quickly the version of the data object at the source changes.

Assume now that during this ongoing replication session an administrator on administrator machine 106 issues an IO request 112(P) to perform a read and/or write operation on the data object 150. For example, the administrator may issue the IO request 112(P) as part of a DR test on the data object 150, which attempts to verify that the data object 150 can assume the role of the actively-accessed production version of the object in the event of failover from source to destination. Upon receiving the IO request 112(P), the data storage system 116 passes the IO request to local orchestration 132, which interrogates the IO target 164 for the data object 150. The IO target 164 stores an identifier of a proper version of the data object 150 to which to direct IO requests. For example, the proper version may be the data object 150 itself, or it may be a system snap of the data object 150, such as system snap 152. Once in possession of the identifier specified in the IO target 164, the local orchestration 132 proceeds to direct the IO request 112(P) to the identified object. For example if the IO target 164 stores an identifier of the system snap 152, the local orchestration 132 directs the IO request 112(P) to the system snap 152. However, if the IO target 164 stores an identifier of the data object 150, the local orchestration 132 directs the IO request 112(P) to the data object 150. The data storage system 116 then performs the specified read and/or write operation on the directed-to object. The data storage system 116 may process other IO requests in a similar way. In some examples, IO requests 112(1) to 112(N) are treated no differently from IO requests 112(P), i.e., IO requests from any user may be subject to the same selective redirection as described above for IO request 112(P).

In an example, local orchestration 132 establishes the IO target 164 to identify the data object 150 during times between consecutive snapshot-shipping updates 118 but changes the IO target 164 to identify the system snap 152 while snapshot-shipping updates 118 are taking place. This operation ensures that IO requests are always directed to a stable version of the data object. For example, during snapshot-shipping updates 118 the data object 150 changes as updates are being applied but the system snaps remain stable. Between updates 118, both the data object 150 and the system snaps remain stable. The data object 150 is preferably selected in this case, however, because it provides the most direct view of the object that will be relied upon to become active and host-accessible once failover occurs.

Figure 2:
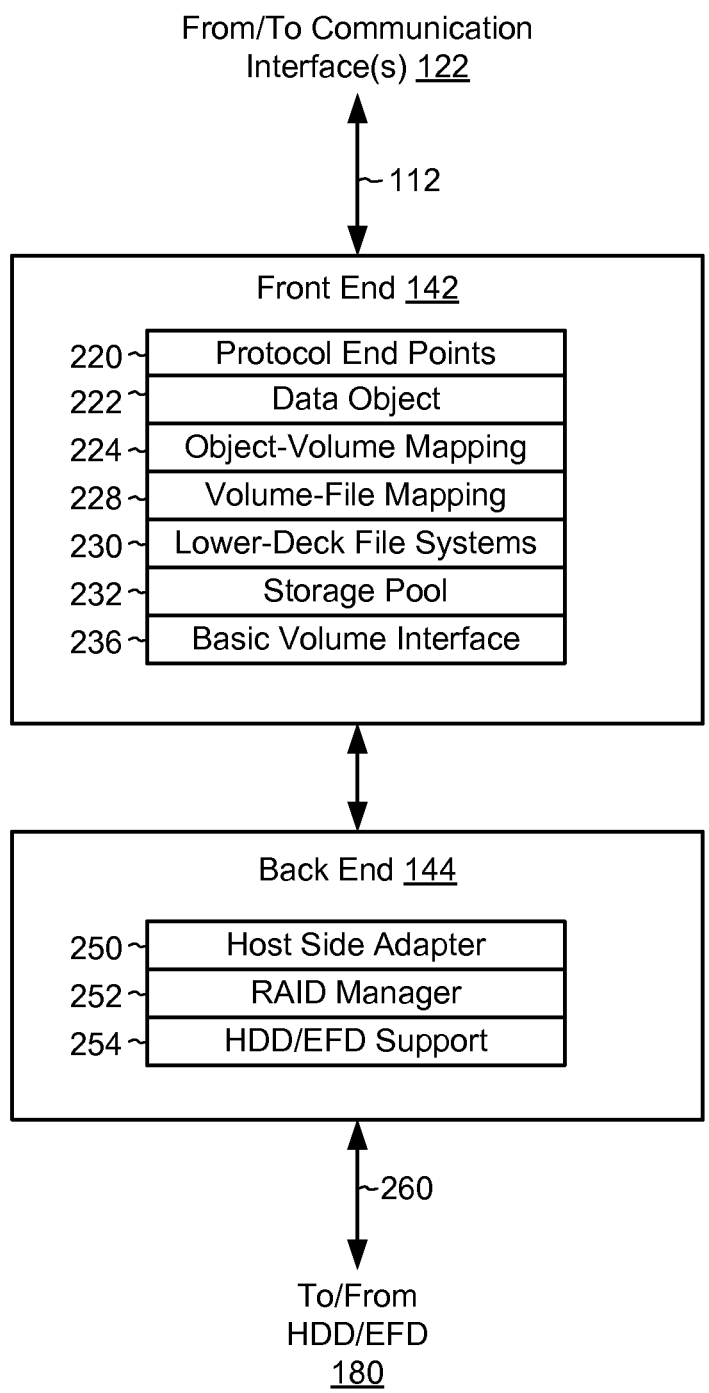
FIG. 2 is a block diagram showing an example IO stack of a storage processor of FIG. 1 in additional detail.

FIG. 2 shows the IO stack 140 in additional detail. Here, the front end 142 is seen to include protocol end points 220, a data object layer 222, an object-volume mapping layer 224, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), the components of the IO stack 140 are described herein from the bottom to the top to facilitate understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups and provides access to the RAID groups using RAID protocols. The host side adapter 250 provides an interface to the front end 142, for implementations in which the front end 142 and back end 144 run on different machines. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 run on different hardware. The basic volume interface 236 may be disabled in the arrangement shown in FIG. 1.

The storage pool 232 organizes elements of the storage 180 into slices. A "slice" is an increment of storage space, such as 256 MB or 1 GB in size, which is derived from the storage 180. The pool 232 may allocate slices to lower-deck file systems 230 to support the storage of data objects. The pool 232 may also de-allocate slices from lower-deck file systems 230 if the storage provided by the slices is no longer required. In an example, the storage pool 232 creates slices by accessing RAID groups formed by the RAID manager 252, expressing the RAID groups as FLUs (Flare LUNs), and dividing the FLU's into slices.

The lower-deck file systems 230 are built upon the slices managed by the storage pool 232 and represent block-based objects and/or file-based objects internally in the form of files (container files). The data storage system 116 may host any number of lower-deck file systems 230, and each lower-deck file system may include any number of files. In a typical arrangement, a different lower-deck file system is provided for each primary data object to be stored. For example, each lower-deck file system includes one file that stores the primary data object (i.e., the production version or replica) and, in some instances, other files that store snaps of the primary file or of other snaps. For instance, and referring briefly back to FIG. 1, the data object 150, system snap 152, and any other snaps of the data object may all reside as respective files within the same lower-deck file system. Each of the lower-deck file systems 230 has an inode table. The inode table provides a different inode for each file stored in the respective lower-deck file system. Each inode stores properties of a respective file, such as its ownership and pointers to block locations within the respective lower-deck file system at which the file's data are stored.

The volume-file mapping 228 maps each file representing a data object to a respective internal volume. Higher levels of the IO stack 140 can then access the internal volume using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets into the volume, the volume-file mapping 228 can establish a one-to-one correspondence between offsets into the file and offsets into the corresponding internal volume, thereby providing the requisite mapping needed to express the file in the form of a volume.

The object-volume mapping layer 224 maps internal volumes to respective host-accessible data objects, such as LUNs, host file systems, and VVols. For LUNs, object-volume mapping may involve a remapping from a format compatible with the internal volume to a format compatible with the LUN. In some examples, no remapping is needed. For host file systems, object-volume mapping leverages the fact that file systems are customarily built upon volumes, such that an underlying volume is part of the structure of any file system. Host file systems, also called "upper-deck file systems," are built upon the internal volumes presented by the volume-file mapping 228 to provide hosts with access to files and directories stored within the host file systems. Mapping of VVols can be achieved in similar ways. For block-based VVols, the object-volume mapping layer 224 may perform mapping substantially as it does for LUNs. For file-based vVOLs, the object-volume mapping layer 224 may convert host-specified offsets into VVol files to corresponding offsets into internal volumes.

The protocol end points 220 expose the underlying data objects to hosts in accordance with respective protocols. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Figure 3:
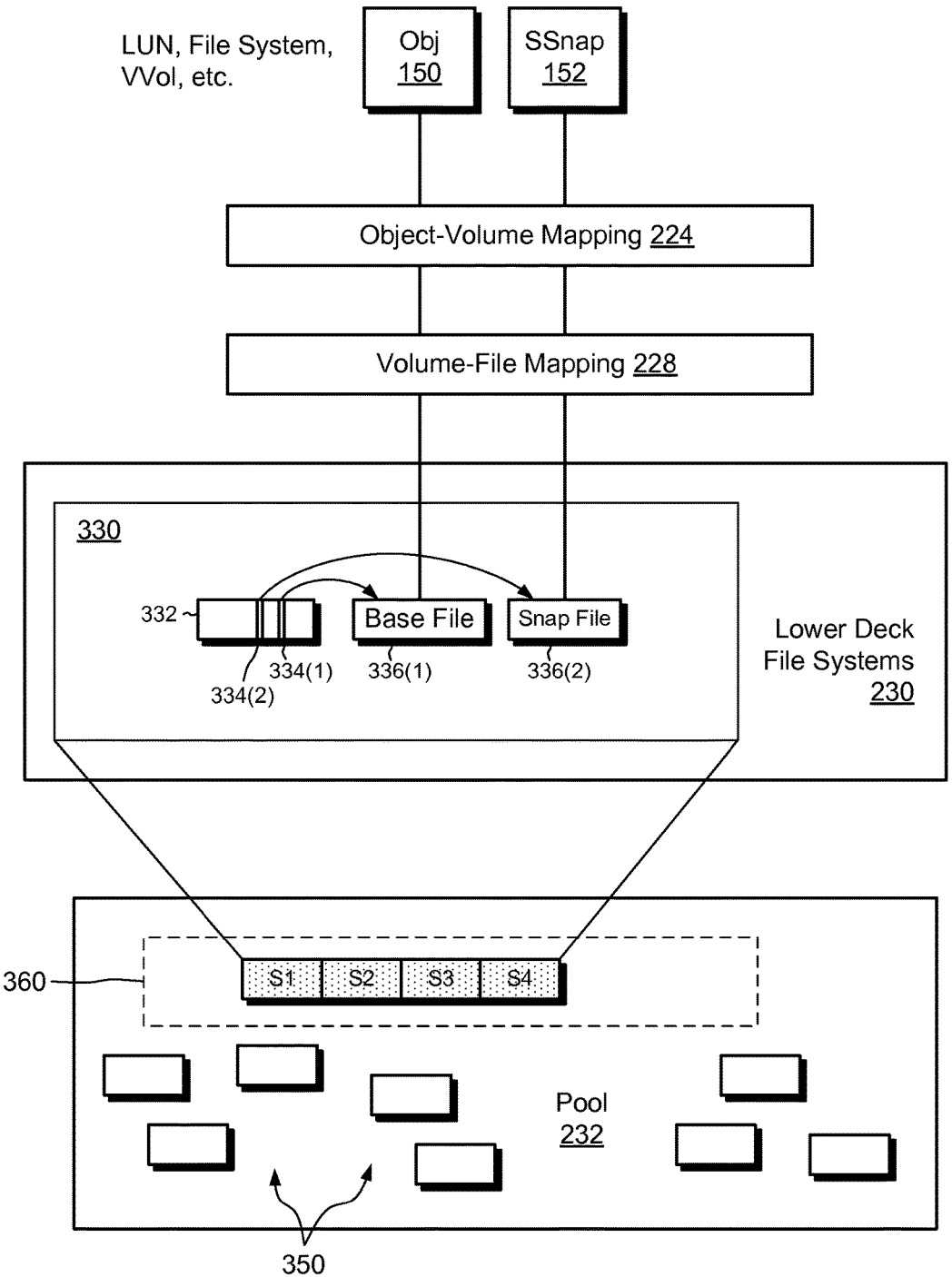
FIG. 3 is a block diagram showing example features of the IO stack of FIG. 2.

FIG. 3 shows portions of the front end 142 in additional detail. Here, the front end 142 is seen to realize the data object 150 and system snap 152 using base file 336(1) and snap file 336(2), respectively, within a single lower-deck (container) file system 330. The lower-deck file system 330 has an inode table 332, which includes a different inode for each file. For example, the inode table 332 includes an inode 334(1) that describes the base file 336(1) and an inode 334(2) that describes the snap file 336(2). Volume-file mapping 228 expresses each of the files 336(1) and 336(2) as respective volumes, which may be accessed using block-based semantics, and object-volume mapping 224 expresses each of the volumes as respective host-accessible objects (e.g., LUN, host file system, VVol, etc.). The storage pool 232 provisions slices 360 to the lower-deck file system 330, to support storage of data and metadata for the files 336(1) and 336(2). Other slices 350 are available to be provisioned to the lower-deck file system 330 on demand.

In an example, the snap file 336(2) is a point-in-time version of the base file 336(1). To create a snap of the base file 336(1), the lower-deck file system 330 creates new metadata for the snap but configures the new metadata to point initially to all the same data blocks as does the base file 336(1). Subsequent changes to the base file 336(1) may result in write splits and new block allocations to the base file 336(1), but the data of the snap remains constant. Thus, a snap may initially share all the same data with its base file at the time the snap is taken. Subsequent changes to the base file have no effect on the data of the snap. The snap thus retains a point-in-time version of the base file, even as the base file changes. Although FIG. 3 shows only one system snap, it should be understood that the lower-deck file system 330 may include any number of snaps, which may include both system snaps and user snaps.

Figure 4:
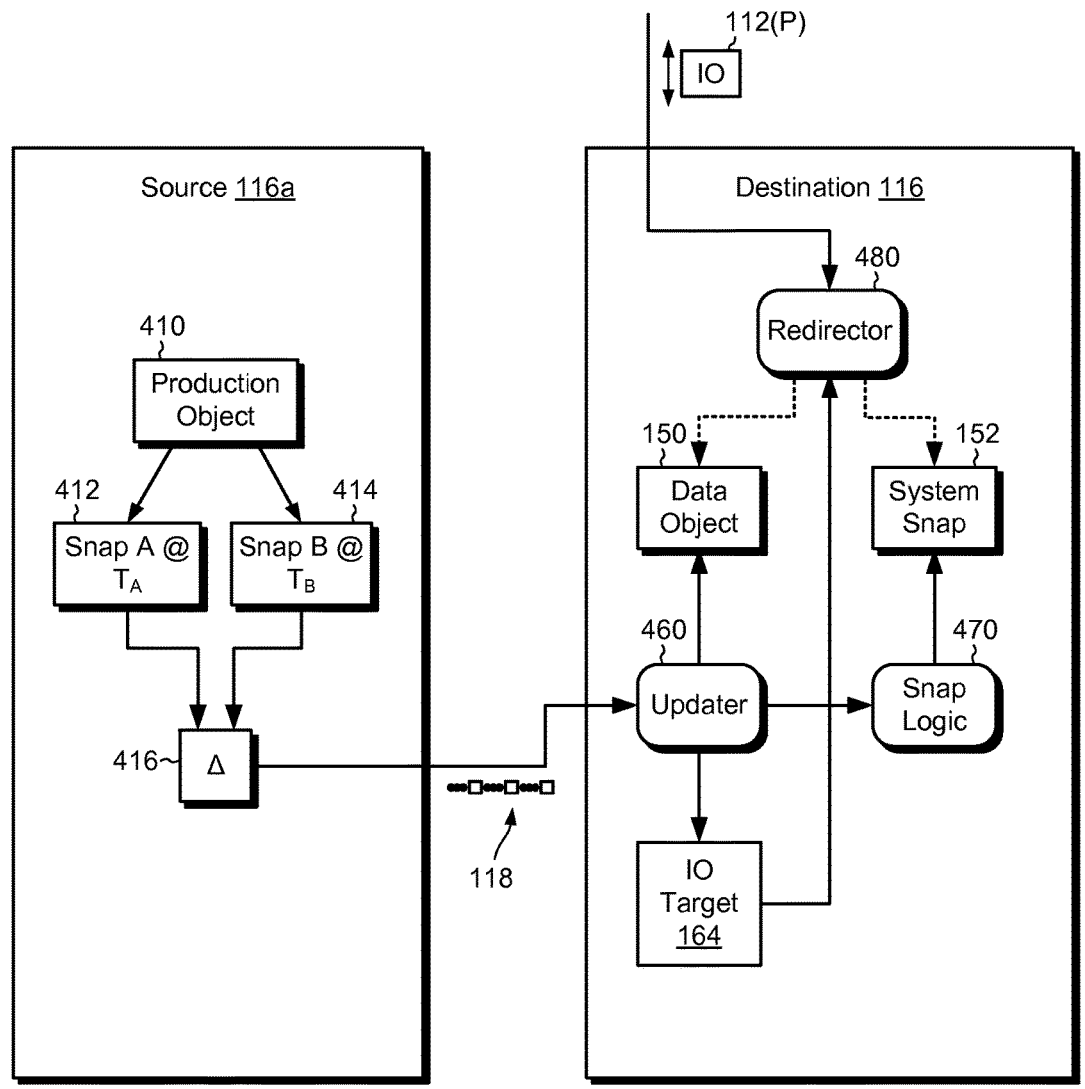
FIG. 4 is a block diagram showing example source and destination data storage systems conducting snapshot-shipping replication.

FIG. 4 shows an example snapshot-shipping arrangement. Here, a source data storage system 116a stores a host-accessible production object 410 (e.g., a LUN, host file system, VVol, etc.). Hosts may access the production object 410 from the source 116a for reading and writing, such that the production object 410 changes over time. It is assumed in this example that a replication session has been established for the production object 410, which employs snapshot-shipping to maintain a replica of the production object 410 at the destination data storage system 116. It is further assumed in this example that the destination data storage system 116 is the same data storage system 116 as shown in FIG. 1, and that the replica of the production object 410 is the same data object 150 as shown in FIG. 1.

To keep the data object 150 approximately current with the production object 410 as the production object changes in response to host IOs, the source data storage system 116a generates multiple snapshot-shipping updates 118 over time and sends the updates 118, one at a time, to the destination 116. To generate each snapshot-shipping update 118, the source 116a takes a snap 414 (Snap B) of the production object 410 at Time B (the current time) and compares Snap B with another snap 412 (Snap A) taken at Time A (the time the previous update 118 was prepared). A difference operator 416 identifies changes between the snaps 412 and 414. In an example, the difference operator 416 expresses the changes as a list of block locations and respective block values. The source 116a then sends the changes in the snapshot-shipping update 118 to the destination 116.

At the destination 116, an updater 460, e.g., running within the local orchestration 132, receives the snapshot-shipping update 118 and detects the beginning of processing the snapshot-shipping update 118. In response to this detection, the updater 460 sets the IO target 164 for the data object 150 to identify the system snap 152 as the object to which to direct IO requests, and proceeds to begin applying the changes specified in the update 118 to the data object 150 (i.e., to the base file 336(1)—see FIG. 3). If an IO request 112(P) arrives while the updater 460 is updating the data object 150, a redirector 480, also within local orchestration 132, checks the IO target 164, which here identifies the system snap 152, and proceeds to redirect the IO request 112(P) to the identified object, i.e., the system snap 152 (file 336(2)). The data storage system 116 then performs the read and/or write operation specified in the IO request 112(P) on the file 336(2). Upon the updater 460 completing the update 118 to the data object 150, the updater 460 detects the end of the update 118. In response to this detection, the updater 460 sets the IO target 164 to identify the data object 150 (file 336(1)) and directs snap logic 470 (also within local orchestration 132) to take a new system snap of the newly updated data object 150, such that the new system snap becomes the system snap 152. In an example, the new system snap 152 replaces the previous system snap 152, which may be destroyed to conserve space. If an IO request 112(P) arrives at this point, the redirector 480 again checks the IO target 164, which now identifies the data object 150, and the redirector 480 directs the IO request 112(P) to the identified object, i.e., to the data object 150 (file 336(1)). The data storage system 116 then performs the read and/or write operation specified in the IO request 112(P) on the file 336(1).

Figure 5:
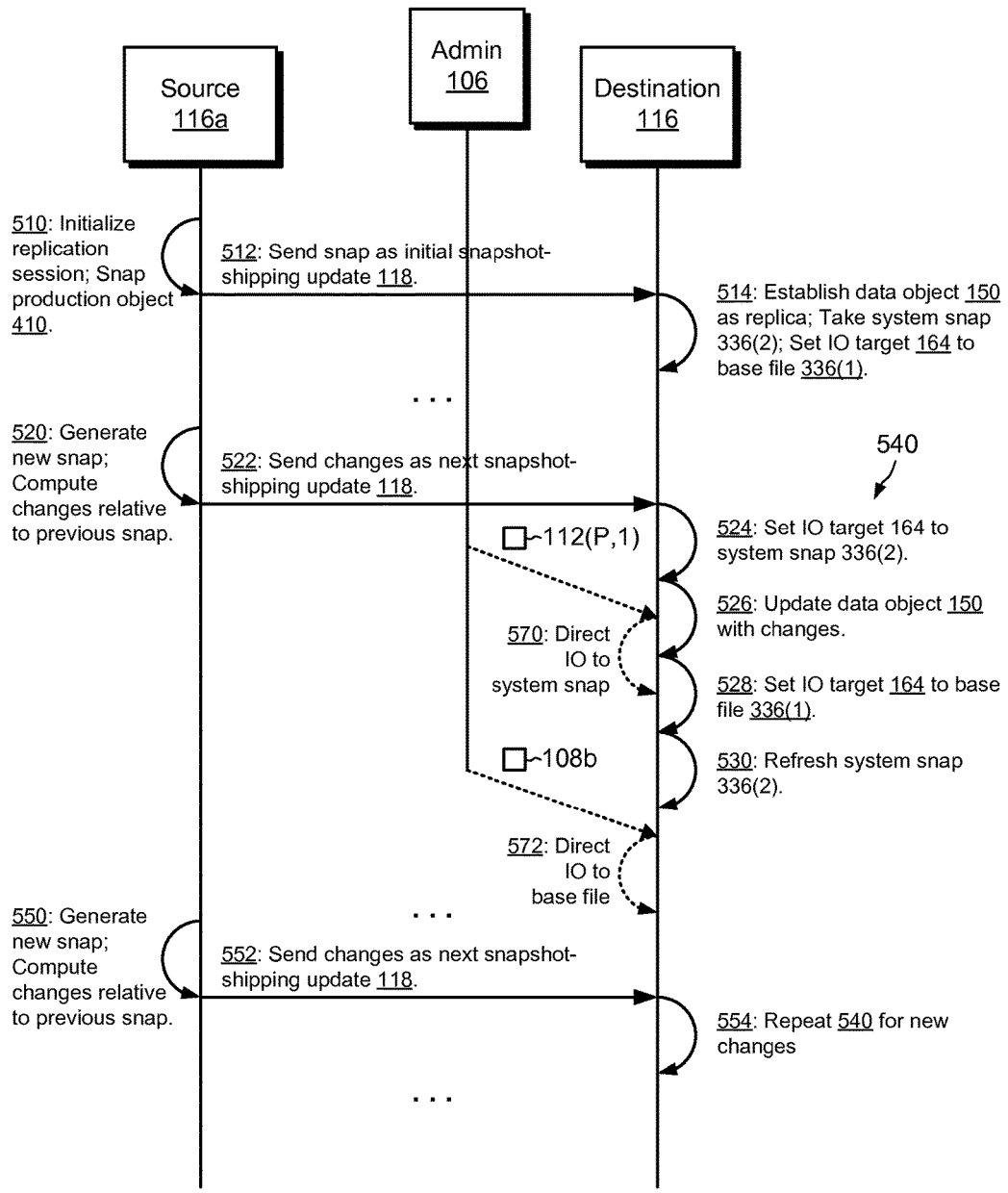
FIG. 5 is a sequence diagram showing an example process for responding to IO requests in the course of processing multiple snapshot-shipping updates.

FIG. 5 shows an example sequence for performing multiple snapshot-shipping updates on the production object 410, to maintain the data object 150 as a replica, where an IO request 112(P) specifying a read and/or write operation on the data object 150 may arrive at any time.

At 510, source 116a initializes replication and takes an initial snap of the production object 410.

At 512, the source 116a sends the initial snap to the destination 116 as an initial snapshot-shipping update 118.

At 514, the destination 116a establishes the data object 150 as a replica of the production object 410 and takes an initial system snap 152 (e.g., snap file 336(2)). At this time, the destination 116 also sets the IO target 164 to identify the data object 150 (e.g., the base file 336(1)) as the object to which to direct IO requests.

Sometime later, e.g., after the production object 410 has accumulated changes in response to continuing to process host IOs, the source 116a may generate another snapshot-shipping update 118.

At 520, the source 116a generates a new snap and computes a new set of changes relative to the previous snap.

At 522, the source 116a sends the computed changes in another snapshot-shipping update 118 to the destination 116.

At 540, the destination 116 performs a series of steps, 524, 526, 528, and 530. For example, at step 524 the destination 116 sets the IO target 164 to the system snap 152 (file 336(2)). At 526, the destination 116 updates the data object 150 (file 336(1)) to incorporate the new changes arriving with the most recent snapshot-shipping update 118. At 528, once the changes have been applied, the destination 116 sets the IO target 164 back to the data object 150 (base file 336(1)). At 530, the destination 116 refreshes the system snap 152 (file 336(2)). For example, the destination 116 takes a new system snap 152 and replaces the previous system snap 152 with the new one.

Sometime later, after yet more changes have been made to the production object 410, the source 116 generates yet another snap and computes the changes relative to the previous snap (step 550). At step 552, another snapshot-shipping update 118 is sent to the destination 116, and at 554 the series of steps 540 is repeated for incorporating the new updates. These events can be repeated indefinitely for generating and processing new snapshot-shipping updates 118.

As these replication activities ensue, and at any time with respect thereto, the destination 116 may receive an IO request 112(P) to perform a read and/or write operation on the data object 150. In one example, an IO request 112(P, 1) arrives during the sequence 540, i.e., while the destination 116 is in the process of applying a snapshot-shipping update 118. In this situation, as indicated at step 570, the destination 116 directs the IO request 112(P, 1) to the system snap 152 (i.e., to file 336(2)), in accordance with the settings of the IO target 164, which identifies the system snap 152 as the object to which to direct IO requests. In another example, a request 112(P, 2) arrives between snapshot-shipping updates 118. In this scenario, as indicated at step 572, the destination 116 directs the IO request 112(P, 2) to the data object 150 (to file 336(1)), in accordance with the settings of the IO target 164, which identifies the data object 150 as the object to which to direct IO requests.

Figure 6:
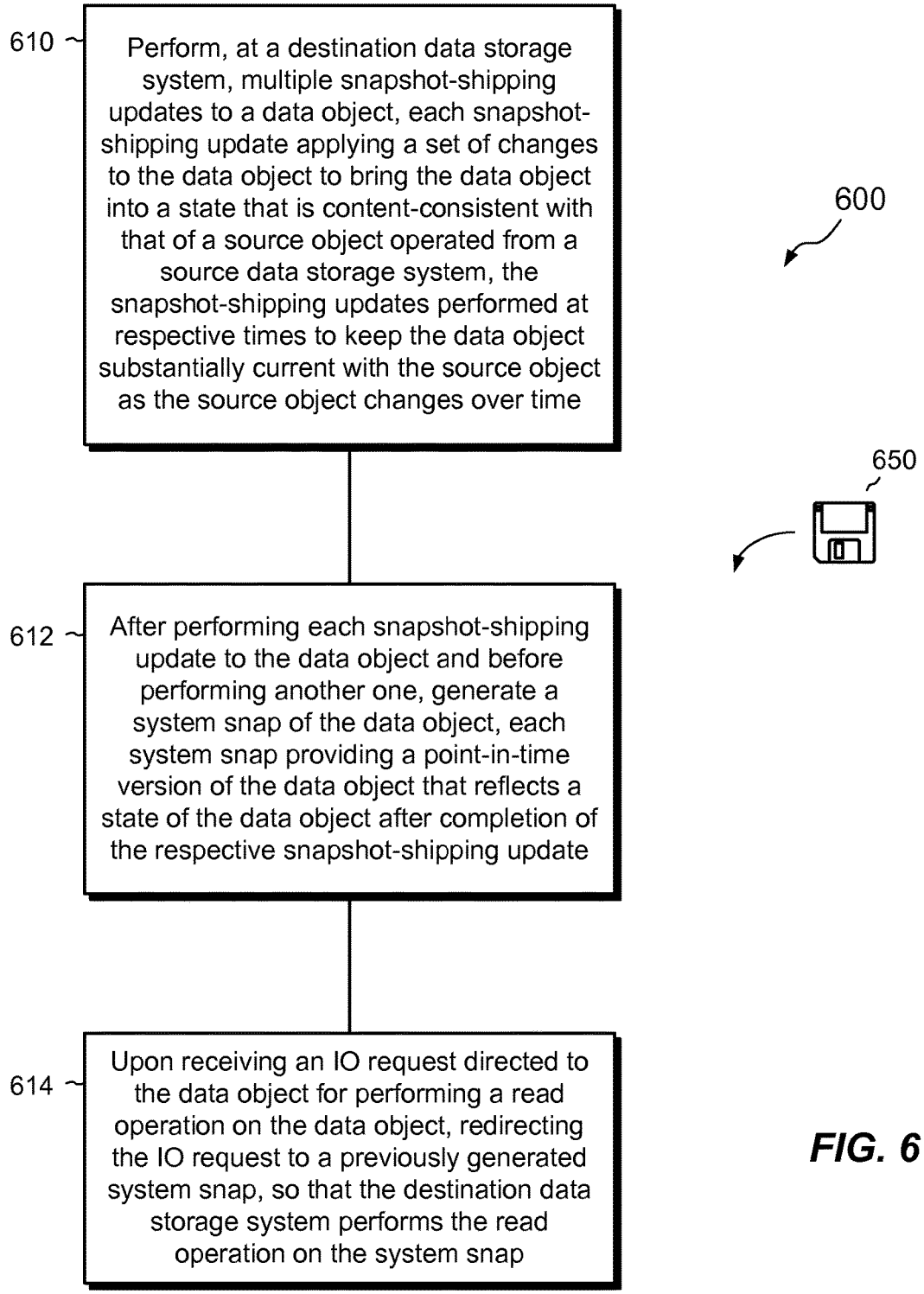
FIG. 6 is a flowchart an example method for processing IO requests.

FIG. 6 shows an example process 600 that may be carried out in connection with the data storage system 116 and provides a summary of many activities described above. The process 600 is typically carried out by the software constructs, described in connection with FIGS. 1-4, which reside in the memory 130 of the storage processor 120 and are run by the set of processing units 124.

At 610, multiple snapshot-shipping updates to a data object are performed at a destination data storage system. Each snapshot-shipping update applies a set of changes to the data object to bring the data object into a state that is content-consistent with that of a source object operated from a source data storage system. The snapshot-shipping updates are performed at respective times to keep the data object substantially current with the source object as the source object changes over time. For example, multiple snapshot-shipping updates 118 to data object 150 are performed in data storage system 116 (FIG. 1). Different snapshot-shipping updates 118 are performed over time and bring the data object 150 into content-consistent state with that of a production object 410 (FIG. 4), which may be accessed by hosts such that its contents change over time.

At 612, after performing each snapshot-shipping update to the data object and before performing another one, a system snap of the data object is generated. Each system snap provides a point-in-time version of the data object that reflects a state of the data object after completion of the respective snapshot-shipping update. For example, after the data storage system 116 applies each snapshot-shipping update 118, the data storage system 116 takes a system snap 152 of the data object 150. The system snap 152 remains consistent even as the data object 150 changes in response to any later-received snapshot-shipping update 118.

At 614, upon receiving an IO request directed to the data object for performing a read operation on the data object, the IO request is redirected to a previously generated system snap, so that the destination data storage system performs the read operation on the system snap. For example, upon receiving an IO request 112(P) from an administrator, which specifies a read operation to be performed on the data object 150, the data storage system 116 redirects the IO request 112(P) to the system snap 152, such that the data storage system 116 performs the specified read operation on the system snap 152 rather than directly on the data object 150. In other examples, the data storage system 116 may direct an IO request to the data object 150 directly, based on the value of the IO target 164 (FIGS. 1 and 4).

Having described certain embodiments, numerous alternative embodiments or variations can be made. For example, although Celerra Replicator™ V2 has been presented as one example of a technology for snapshot-shipping replication, the inventive concepts disclosed herein are not limited to use with Celerra Replicator™ V2 or to any particular product, but rather may be used with any snapshot-shipping replication technology.

Also, although certain types of snaps have been disclosed herein, the invention should not be construed as being limited to those types of snaps. Rather, the invention hereof is intended to apply to snaps or copies of any kind.

Further, although it has been shown and described that the destination data storage system 116 retains a single, most current system snap, which may serve as a target of redirection in response to IO requests, while destroying older system snaps, this is merely an example. Alternatively, the destination data storage system 116 may retain any number of system snaps, and may redirect IO requests to system snaps other than the most recent one.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any necessary ordering or sequence. Thus, for example, a second event may take place before or after a first event, or even if no first event ever occurs. In addition, an identification herein of a particular element, feature, or act as a "first" such element, feature, or act should not be construed as requiring that there also must be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method for processing IO (input/output) requests, the method comprising:

performing, at a destination data storage system, multiple snapshot-shipping updates to a data object, each snapshot-shipping update applying a set of changes to the data object to bring the data object into a state that is content-consistent with that of a source object operated from a source data storage system, the snapshot-shipping updates performed at respective times to keep the data object substantially current with the source object as the source object changes over time;

after performing each snapshot-shipping update to the data object and before performing another one, generating a system snap of the data object, each system snap providing a point-in-time version of the data object that reflects a state of the data object after completion of the respective snapshot-shipping update; and upon receiving an IO request directed to the data object for performing a read operation on the data object, redirecting the IO request to a previously generated system snap, so that the destination data storage system performs the read operation on the previously generated system snap, wherein the method further comprises receiving a second IO request directed to the data object for performing a second read operation on the data object; and, in response to the destination data storage system not being in a process of performing any of the snapshot-shipping updates when the second IO request is received, directing the second IO request to the data object for performing the second read operation on the data object, wherein redirecting the IO request to the previously generated system snap is performed in response to the destination data storage system being in the process of performing one of the snapshot-shipping updates when the IO request is received, wherein the data object is realized in a base file stored in a file system of the destination data storage system, wherein each system snap is a snap of the base file and is itself a file in the file system, wherein the method further comprises storing, by the destination data storage system, a data element that identifies a file to which to direct IO requests directed to the data object, wherein redirecting the IO request to the previously generated system snap includes interrogating the data element and identifying, from the data element, a system snap file as the file to which to direct the IO request, wherein directing the second IO request to the data object includes interrogating the data element and identifying, from the data element, the base file as the file to which to direct the second IO request to perform the second read operation, wherein each snapshot-shipping update has a beginning and an end, and wherein the method further comprises:
  detecting the beginning of a snapshot-shipping update on the base file;
  in response to detecting the beginning of the snapshot-shipping update on the base file, setting the data element to identify a system snap file as the file to which to direct IO requests
  detecting the end of a snapshot-shipping update on the base file; and
  in response to detecting the end of the snapshot-shipping update on the base file, setting the data element to identify the base file as the file to which to direct IO requests.

2. The method of claim 1, further comprising, after taking each system snap of the data object, destroying any previously-taken system snap of the data object from the file system.

3. The method of claim 1, wherein the base file provides a file-based realization of one of (i) a LUN, (ii) a file system, or (iii) a VVol.

4. A data storage system, comprising control circuitry that includes a set of processing units coupled to memory, the control circuitry constructed and arranged to:
  perform, at a destination data storage system, multiple snapshot-shipping updates to a data object, each snapshot-shipping update applying a set of changes to the data object to bring the data object into a state that is content-consistent with that of a source object operated from a source data storage system, the snapshot-shipping updates performed at respective times to keep the data object substantially current with the source object as the source object changes over time;
  after performing each snapshot-shipping update to the data object and before performing another one, generate a system snap of the data object, each system snap providing a point-in-time version of the data object that reflects a state of the data object after completion of the respective snapshot-shipping update; and
  upon receiving an IO (input/output) request directed to the data object for performing a read operation on the data object, redirect the IO request to a previously generated system snap, so that the destination data storage system performs the read operation on the previously generated system snap, wherein the memory is constructed and arranged to (i) store a file system including multiple files, (ii) realize the data object as a base file of a file system and snaps thereof in respective other files of the file system, and (iii) store a data element that identifies a file in the file system to which to direct IO requests in response to the data storage system receiving IO requests directed to the data object, wherein each snapshot-shipping update has a beginning and an end and wherein the control circuitry is further constructed and arranged to:
  detect the beginning of each snapshot-shipping update on the base file;
  in response to detecting the beginning of each snapshot-shipping update on the base file, set the data element to identify a system snap file as the file to which to direct IO requests directed to the data object;
  detect the end of each snapshot-shipping update on the base file;
  in response to detecting the end of each snapshot-shipping update on the base file, set the data element to identify the base file as the file to which to direct IO requests directed to the data object; and
  in response to the data storage system receiving each of multiple IO requests directed to the data object, (a) interrogate the data element, (b) identify, from the data element, the file to which to direct the respective IO request, and (c) perform the operation specified by the respective IO request on the file identified in the data element.

5. The data storage system of claim 4, wherein the base file provides a file-based realization of one of (i) a LUN, (ii) a file system, or (iii) a VVol.

6. A computer-program product including a set of non-transitory, computer-readable media including instructions which, when executed by a set of processing units of a destination data storage system, cause the set of processing units to perform a method for generating snaps, the method comprising:
  performing, at a destination data storage system, multiple snapshot-shipping updates to a data object, each snapshot-shipping update applying a set of changes to the data object to bring the data object into a state that is content-consistent with that of a source object operated from a source data storage system, the snapshot-shipping updates performed at respective times to keep the data object substantially current with the source object as the source object changes over time;
  after performing each snapshot-shipping update to the data object and before performing another one, generating a system snap of the data object, each system snap providing a point-in-time version of the data object that reflects a state of the data object after completion of the respective snapshot-shipping update; and
  upon receiving an IO (input/output) request directed to the data object for performing a read operation on the data object, redirecting the IO request to a previously generated system snap, so that the destination data storage system performs the read operation on the previously generated system snap, wherein the method further comprises (i) storing a file system including multiple files, (ii) realizing the data object as a base file of a file system and snaps thereof in respective other files of the file system, and (iii) storing a data element that identifies a file in the file system to which to direct IO requests in response to the data storage system receiving IO requests directed to the data object, wherein each snapshot-shipping update has a beginning and an end and wherein the method further comprises:
  detecting the beginning of each snapshot-shipping update on the base file;
  in response to detecting the beginning of each snapshot-shipping update on the base file, setting the data element to identify a system snap file as the file to which to direct IO requests directed to the data object;
  detecting the end of each snapshot-shipping update on the base file;
  in response to detecting the end of each snapshot-shipping update on the base file, setting the data element to identify the base file as the file to which to direct IO requests directed to the data object; and
  in response to the data storage system receiving each of multiple IO requests directed to the data object, (a) interrogating the data element, (b) identifying, from the data element, the file to which to direct the respective IO request, and (c) performing the operation specified by the respective IO request on the file identified in the data element.

7. The computer program product of claim 6, wherein the method further comprises:
  receiving a second IO request directed to the data object for performing a second read operation on the data object; and
  in response to the destination data storage system not being in a process of performing any of the snapshot-shipping updates when the second IO request is received, directing the second IO request to the data object for performing the second read operation on the data object.

8. The computer program produce of claim 6, wherein the base file provides a file-based realization of one of (i) a LUN, (ii) a file system, or (iii) a VVol.

9. The computer program product of claim 7, wherein redirecting the IO request to the previously generated system snap is performed in response to the destination data storage system being in the process of performing one of the snapshot-shipping updates when the IO request is received.

10. The computer program product of claim 9, wherein the data object is realized in a base file stored in a file system of the destination data storage system, wherein each system snap is a snap of the base file and is itself a file in the file system.

11. The computer program product of claim 10, wherein the method further comprises, after taking each system snap of the data object, destroying any previously-taken system snap of the data object from the file system.

12. The computer program product of claim 10,
  wherein redirecting the IO request to the previously generated system snap includes interrogating the data element and identifying, from the data element, a system snap file as the file to which to direct the IO request, and
  wherein directing the second IO request to the data object includes interrogating the data element and identifying, from the data element, the base file as the file to which to direct the second IO request to perform the second read operation.

* * * * *